United States Patent [19]

Bernstein et al.

[11] 4,396,693

[45] Aug. 2, 1983

[54] PRODUCTION OF A CELL ELECTRODE SYSTEM

[75] Inventors: Philip Bernstein, Glen Ridge, N.J.; James P. Coffey; Alan E. Varker, both of Warwick, N.Y.; John T. Arms, Monroe, N.Y.; William D. K. Clark, Warwick, N.Y.

[73] Assignee: MPD Technology Corporation, Wychkoff, N.J.

[21] Appl. No.: 323,876

[22] Filed: Nov. 23, 1981

Related U.S. Application Data

[62] Division of Ser. No. 226,527, Jan. 19, 1981, Pat. No. 4,320,185.

[51] Int. Cl.$^3$ .............................................. H01M 4/62
[52] U.S. Cl. .................................... 429/217; 252/182.1
[58] Field of Search ............................... 429/212, 217; 252/182.1

[56] References Cited

U.S. PATENT DOCUMENTS

| | | | |
|---|---|---|---|
| 4,071,946 | 2/1978 | Nilsson | 429/217 X |
| 4,110,519 | 8/1978 | Nilsson | 429/217 |
| 4,177,157 | 12/1979 | Adams | 429/212 X |
| 4,216,045 | 8/1980 | Morioka | 429/212 X |
| 4,315,829 | 2/1982 | Duddy | 429/217 X |

*Primary Examiner*—Charles F. LeFevour
*Attorney, Agent, or Firm*—Raymond J. Kenny; Miriam W. Leff

[57] ABSTRACT

An improvement in the production of polymer-bonded cell electrodes comprises forming a particulate material which can be developed into a shaped polymeric system comprising an electrode active material encradled in a porous, fiber-containing, polymeric composition. In a preferred embodiment, the polymeric system is developed as a thin, flexible electrode.

6 Claims, No Drawings

PRODUCTION OF A CELL ELECTRODE SYSTEM

This is a division of application Ser. No. 226,527 filed Jan. 19, 1981, now U.S. Pat. No. 4,320,185.

The present invention relates to a process for preparing an electrode active, porous polymeric composition. More particularly, it concerns a porous, conductive, cell electrode and the preparation thereof.

BACKGROUND OF THE INVENTION

The use of polymers as binders and wet proofing agents in cell electrodes containing finely divided electrochemically active material has been described and used for many years. In general, efforts have been made to improve the materials so that a minimum amount of binder can provide a maximum bonding effect for the active particles. Fibrous polymers have been proposed for this purpose. In U.S. Pat. Nos. 3,630,781 and 3,954,501, for example, electrodes are prepared from a fluorocarbon polymer very finely dispersed in a liquid, e.g., water. The dispersion, which is in essence a liquid-type dispersion, is mixed with a surfactant and finely divided active material, and the mixture is used in a paste or a liquid carrier, preferably on the colloidal level. At a stage in the process, the fluorocarbon is precipitated as a fibrous material, e.g., by freezing, increasing the pH, or by solvent extraction. Existing processes for converting polymers to fibrous form from such liquid-type dispersion have many problems. One of the most serious limitation of existing processes employing liquid dispersions is removal of the liquid in which the polymer is dispersed. This requirement introduces an energy intensive step which limits and complicates the processing of the material. Dispersing agents as usually formulated may contain a dispersing additive such as a surfactant, and such additives may have a detrimental effect on the performance of an electrode. It also may be difficult to control or obtain a desired uniform distribution of active material throughout the dispersion during processing. The liquid dispersion system also has constraints with respect to processing flexibility in fabricating the end product. For example, it is difficult to produce a membrane via a milling process using a liquid or paste. A liquid or paste must be applied to a support in order to be fabricated into a shaped product. Also, the polymeric binders prepared from liquid-type formulations limit the exposure of the active material, which limits the capacity of electrodes made from such materials.

A further problem is that the active particles may undergo changes in volume during the use, and it has been difficult to find a suitable polymeric electrode active material which will tolerate large changes in volume of the active material, should they occur in operation of the cell.

Co-pending U.S. application Ser. No. 226,502, filed Jan. 19, 1981 now U.S. Pat. No. 4,320,184, discloses an electrode and a method of preparing such electrode in which electrode active particles are held by a fibrillated polymeric material without the necessity of sintering the material or using a separate supporting structure. The method avoids the problems arising out of using liquid-type dispersions or emulsions to fabricate the electrode, and it makes possible greater flexibility in cell design. The present invention is a further improvement in that it gives a further dimension in freedom in cell design when needed.

SUMMARY OF THE INVENTION

In accordance with one aspect of the present invention, an electrode active, conductive composition (the electrode system) is produced which is comprised of electrode active particles encradled in a porous, fiber-containing, polymeric composition. The electrode system has structural integrity without the necessity of sintering the material or using a separate supporting structure. The electrode system is composed predominantly of the electrochemically active material, i.e. over 50% by weight, is active material. Preferably the electrode active material constitutes at least about 80%, and typically it constitutes about 75% to 95% by weight of the electrode system.

The electrode system is formed from a precursor electrode composition, which is comprised of fibrils developed from a fibrillatable first polymer dispersed throughout a substance comprising electrode active (or activatable) particles, a support-contributing second polymer, and a removable, polymeric pore-former. Transformation to the electrode system is achieved by removal of the pore-former.

The precursor electrode composition is prepared from electrode active (or activatable) material, preferably a conductive carbon powder, a fiber-forming first polymer, a support-contributing second polymer, a removable, polymeric pore-former, and if necessary a processing agent, by a method comprising subjecting said components to conditions for fibrillating the fiber-forming polymer and for developing an intimate mixture of such components throughout the composition. Preferably the components are processed to fibrillate the fiber-forming polymer by a dry processing technique and under shear stresses. After removal of the pore-former, which is present in a major amount in the precursor electrode composition, the resultant electrode system is a porous, fiber-containing conductive material. The material can be produced as particles or shaped, e.g. as rods or tubes or as a thin, flexible sheet.

In co-pending application Ser. No. 224,454 filed Jan. 19, 1981 now U.S. Pat. No. 4,377,046, a process is disclosed for preparing a polymeric active material and such process is incorporated herein by reference. It was found that the active material encradled in porous, fiber-containing polymeric material prepared by the process disclosed exhibited maximized access to the active particles. According to the present invention, the method of this copending application is adapted to the preparation of an electrode system.

In a preferred embodiment of this invention, the polymer is processed in a dry state thereby permitting greater freedom in the materials which can be used in the electrode and in the processing steps. Also, by using a dry processing technique, the electrode system can be produced in a standard polymer processing equipment, such as mills, extruders and molding machines.

It is another aspect of the invention that the process is very flexible as to the structural form produced. The particular shape desired can be obtained simultaneously with the conversion to fibrous forms or immediately thereafter in conventional equipment. It is another aspect of the invention that the electrode system can be produced in the form of a flexible sheet. This can be accomplished, e.g., on a mill or calendered directly as it comes from an extruder. To form the electrode, the flexible film is combined with a current collector which may be for example, a metallic deposit, or a conductive film, wire screen or expanded metal.

DETAILED DESCRIPTION OF THE INVENTION

As indicated above, the electrode system is comprised of an electrode active (or activatable) material, a fibrillated first polymer, and a support-contributing second polymer. Advantageously, it also contains a conductive carbon, and it is characterized in that it is porous and conductive. It is further characterized in that the pores are formed in-situ by a method which maximizes the accessibility of the active material.

The selection of the specific polymers forming the support-contributing component of the electrode system will depend on the design of the cell and the ultimate cell system in which it will be used. In general, the support-contributing polymers should have the following characteristics: they must be compatible with the cell environment in operation, they must not interfere with or impede the activity of the cell, and they must serve the structural purpose for which they were intended. It is an advantage of the present electrode systems that they can be provided with strength and structural integrity combined with flexibility, depending on the choice of support-contributing polymer. The use of the support-contributing polymer in addition to the fibrillatable polymer adds another dimension of freedom of design of the system and the cell. By way of illustration, the following support-contributing polymers can be used either individually or in suitable combinations: polyolefins such as polyethylene, polypropylene, polybutylene, polyisobutylene or a copolymer thereof with ethylacrylate and/or vinyl acetate; polyvinylacetate; halogenated polyhydrocarbons and copolymers thereof; polyamides; polysulfones; polyacetates; polycarbonates; polyesters; cellulose esters; or silicones. Preferred support-contributing polymers are thermoplastic polymers, e.g. polyolefins such as polyethylene, polypropylene, and copolymers thereof because they are substantially saturated compounds and as such would have no interaction with the active material.

The electrode active material, which is the predominant component of the electrode system—and may constitute even over 98% of the structure, is determined by the particular cell design. It can be any electrode active active material such as nickel, copper, mercury, cadmium, lead, manganese, silver, platinum group metals, compounds thereof e.g. oxides of mercury, silver cadmium, lead, manganese, alloys, mixtures and combinations thereof. The terms "electrode active" or "active" material will be understood to include elements, compounds, alloys, and mixtures thereof which are activatable, i.e. they can be converted even after incorporation in the electrode system into an active form. The term "elements" includes carbon and graphite, and in such case, the active material and carbon component may be the same. In general, the active material in the present electrode system is in powder form and preferably it is very finely divided. Typically, for example, the manganese dioxide active particles pass a $-100$ mesh screen and 60-70% a $-325$ mesh screen. It is an advantage of the present invention that the active particles can be very fine and the system can accommodate changes in size and volume of the electrode active material. The fibers minimize losses due to attrition.

With respect to the fibrous component of the electrode system, generally, it is important that the fibrillatable polymer is not detrimental to the electrochemical activity of the active material, and for use in many cells, it is important that it is highly resistant to corrosive environments. Fluorocarbon and propylene polymers have these suitable characteristics. To be useful for the process of the present invention, it is also advantageous for the polymer to be fibrillatable in a dry-type process. Such polymers are known. For example, polytetrafluoroethylene (PTFE) can be fibrillated from a dry powder and it is commercially available as duPont's "Teflon" 6A and 7A. Fibrillatable polypropylene is available, for example, as strands, tape or film which can be used, e.g., as such or cut or chopped to appropriate size. The fibrous component is effective even when present in small amounts, e.g. about 0.5 to 5%, typically about 1-2%.

The conductive carbon powder is present in an amount of up to about 25% of the system, by weight, and advantageously in an amount to provide at least some electrical conductivity to the electrode system. Examples of suitable carbon powders are acetylene black and graphite. Examples of commercially available conductive carbon powders are "Shawinigan" black (a product of Shawinigan Products Corp.). "Vulcan" XC-72 and "Regal" 660 ("Vulcan" and "Regal" carbon blacks are products of Cabot Corp.), Ashland "United" ( a product of Ashland Chemical Co.) and "Ketjen" black (a product of Akzo Chemie NV).

To develop the porous electrode system, after conversion of the polymer to fibers, the pore-forming agent is removed, leaving the active particles loosely held by fibers. The pore-forming agents apart from being removable are further characterized in that they are polymers, they are non-reactive with the active material and the electrodes fibers, they are compatible with other compounds of the electrode system, and preferably they wet or can be made to wet the surfaces of the active material. That is, the pore-former will spread on or can be made to spread on the active material. It is believed that if the pore-former wets the surfaces of the active material, i.e. before removal, this will contribute to the accessibility of the active materials when the pore-former is removed. It is preferred that the pore-forming agents melt substantially below the temperature at which the active material will react and further that they serve as a processing agent in the system. By removable is meant that the pore-former can be removed in any way that is not harmful to the remaining components and in a way that will leave the remaining material in a porous condition. In accordance with the present invention, the pore-former serves as incipient sites for the pores, and after removal, the pores can be interconnecting and distributed throughout the remaining material. The pore-former may be, for example, leachable directly, convertible to leachable compositions or to gaseous products. Leachable pore-forming agents may be selected, for example, from water-soluble, acid-soluble, base-soluble or organic solvent-soluble resins. Water-soluble resins can be removed by leaching with water. It is noted in this regard that addition of water to the formulated fibrous material is not critical or disadvantageous since water added at this stage does not interfere with the advantageous flexibility in processing of the dry mix. Examples of pore-formers of the water-soluble type are polyolefin oxides such as polyethylene oxide, polypropylene oxide and sugars. Examples of other leachable pore-formers are polyethylenimine, which can be leached with dilute sulfuric acid; polyacrylic acid, which can be leached with dilute sodium hydroxide; and suitable paraffin waxes, which can be leached with halogenated solvents. Removal will also be effected by enzyme breakdown. Generally, it is possible to use any of the known pore-forming techniques for polymers so long as it is compatible with the system.

An important characteristic of the pore-former of this invention is that it is a polymer. As such it is compatible with the fibrillatable polymer and can serve as a system without the need for using very large quantities of additives which must be removed from the fibrillatable polymer, e.g. by filtration, before dry processing. That is, the polymeric pore-former serves as the medium which permits the combination of other components of the system to be uniformly distributed and conveniently worked. The amount used is predetermined primarily by the amount of porosity desired and not by the processing needs of the fibrillatable polymer. And in accordance with the present invention, processing can be carried out in standard polymer processing equipment. Since, the pore-formed is by definition removable, no unwanted ingredients are added to the system. A further advantage of using a polymeric pore-former is that it can be used at normal working temperatures for polytetrafluoroethylene or polypropylene, i.e. about 75°–100° C. without reaching a hazardous flash point. For example, Stoddard solvent, which is sometimes considered a medium for working polytetrafluoroethylene, is unsuitable as pore-formers for the present process because it has a flash point of 100° to 110° F. Vehicles also not suitable as pore-formers for the present process are those, such as low molecular weight paraffins, naphthenes, or aromatics such as naphthalene, benzene, or industrial solvents that are mixtures of various organic compounds, e.g. Shell-Sol B or mineral spirits, which may volatilize during working on the processing equipment. A critical problem with vehicles which volatilize during processing in that the pore-former is removed before it can serve as the incipient sites for the pores.

Pore-formers such as certain polyolefin oxides, e.g. polyethylene oxide and polypropylene oxide, in addition to being conveniently water soluble and having suitable melting temperatures (e.g. polyethylene oxide melts below 75° C.), have the advantage that they serve as both pore-forming and processing agents for fibrillatable polymers such as polytetrafluoroethylene and polypropylene. In general, such pore-formers have molecular weights in the neighborhood of 100,000 to 1,000,000.

The amount of pore-former to be incorporated in the precursor electrode composition is dependent on the amount of porosity desired in the ultimate product. In general, the pore-former is present in the precursor electrode material in a major amount, i.e. at least about 10% by weight, typically about 15% to about 50%, and preferably over 25 or 30 weight %. In the electrode system, it is desirable to have maximum exposure of the electrode active material and to have free movement of electrolyte throughout the electrode mass. To achieve this the electrode system preferably has about 70 to 80 volume % porosity, and the pores should be interconnecting. For such porosity, an equivalent volume % of leachable pore-former is needed in the precursor electrode composition, i.e. about 70 to 80 volume %. This is equivalent to about 15 to 50 weight % of polyethylene oxide. To obtain porosity of this extent and type using a fugitive gaseous pore-former considerably more pore-former would be necessary, and this could be estimated based on the volume of gas produced and conditions.

After removal of the pore-former, in general, the electrode system is composed, by weight, predominantly of electrode active material (i.e. over 50%) and preferably above 80%. In general, it is composed, by weight, of about 0.5% to about 5% fibrillated polymer, up to about 25% (e.g. about 0.5 to about 25%) conductive carbon, about 0.5% to about 20% support-contributing polymer and the balance essentially electrode active material.

As indicated above, to prepare the porous electrically conductive electrode system the initial components, (e.g., an electrode active material, the fibrillatable polymer, the support-contributing polymer, the carbon powder (if present) and the pore-former) are first converted to the precursor electrode composition by a method comprising subjecting such components to conditions to convert the fibrillatable polymer by a dry processing technique, e.g. as a powder or tape under shear stresses, to fibrous form and to transform the components to a material composed of discrete fibers throughout an intimate mixture comprised of active material, support-contributing polymer, (conductive carbon) and pore-former. The components can all be blended together initially, e.g. in a blender such as a Banbury mixer or a ball mill, and then processed, e.g., in an extruder. Alternatively, the components can be mixed with each other and processed in various sequences depending on the desired ultimate configuration and the equipment used. By removal of the pore-former, the precursor electrode composition is converted to the electrode system. Advantageously, conversion of the filbrillatable polymer to fibers is carried out in-situ. By conversion in-situ is meant that it is fibrillated in the presence of at least one of the components of the system, e.g. the active material.

The electrode system or precursor electrode composition can be formed as pellets and the pellets can be converted to the desired shape by the usual polymer processing techniques, e.g. extrusion, molding, blowing or combinations thereof. As indicated above, with appropriate choice of processing technique, the components can be processed from a dry powder mixture directly to a sheet or bar. The thickness of the sheet or bar can be varied and the electrode material can be produced directly as a flexible sheet or film. Alternatively, for example, it can be made into pellets and the pellets extruded and blown to a film or the pellets can be injection molded to a film. It is noteworthy that the electrode system in which PTFE is the major or only remaining polymer component can be made directly, e.g. by milling or any number of other standard polymer process techniques, into a material which has structural integrity—without sintering. It is particularly an advantage of the present process that PTFE, which is uniquely difficult to process into shaped structures by methods other than sintering, can be readily shaped without sintering using standard polymer processing techniques when using the process of the present invention.

It is known to convert PTFE to fibrous form using a dry processing technique. For example, U.S. Pat. No. 3,838,092 describes a process for producing dustless powders and U.S. Pat. No. 4,071,946 describes a process for producing lead powders for tube electrodes. Both patents refer to fibrillating PTFE by a dry process. Neither patent discloses the porous material of the present invention or the method of obtaining it. In both patents powders are produced, and they are mainly concerned with the handling of fine powders, per se and the prevention of dusting. The latter patent, which involves a tube electrode, specifically seeks to reduce the dusting problem during filling of the electrode.

It is another aspect of the invention that the electrode system can be produced directly as a flexible, coherent sheet. The sheet can be produced in any desired thickness and can be formed as a thin, flexible film e.g. of the order of about 1 to 10 mils, which has structural integrity. Typically, suitable electrode system films can be made of about 1.5 to 5 mils, e.g. 2 to 3 mils. In one embodiment, the initial components of the precursor composition are mixed dry, heated to an elevated temperature, and subjected to shear stresses for a time sufficient to convert the polymer into fibrous form. As noted above, this can be effected in standard polymer equipment, and the sheet or film can be formed in one or more steps and one or more types of equipment. For example, the initial components can be milled, e.g. in a roll-type mill. During such milling the active material and pore-former can be homogeneously mixed and the fibers can be distributed throughout the mixture. The product from the mill is peeled from the rollers in sheet form. Porosity is obtained by removing the pore-former from the milled sheet, and the sheet can be produced in this way with good mechanical strength, and it is in a manageable form. Porosity and conductivity of the electrode system can be controlled, e.g., with appropriate use of pore-formers and carbon. The polymeric material as it comes from the mill can be processed immediately or stored in a dry state. The electrode can be made as a flexible film in any desired thickness, and it can be easily combined with a current collector such as a conductive film, wire screen or expanded metal.

EXAMPLE I

This example illustrates the process of the invention carried out in a mill. The materials used in the process are listed in order of loading preference on the mill.

1. The Support-Contributing Polymer—Polyethylene
2. The Pore-Former—Polyethylene oxide
3. The Fibrillatable Polymer—Polytetrafluoroethylene
4. The Conductive Carbon—Carbon black
5. The Active Material—$MnO_2$ A two-roll rubber mill is used, with mill processing temperature set at 75° C. In a typical test mix: To a running mill is added 10 grams of polyethylene and 80 grams of pore-former (e.g. WSRN-10, a product of Union Carbide). When the resin has formed a band, a 2 gram charge of fibrillatable polymer (e.g. TEFLON 6A, a product of duPont) is added slowly and the fibrillatable polymer is permitted to join the resin band. The material is scraped from the mill and refolded to make a homogeneous mixture. Then, 15 grams of carbon black (e.g. Shawinigan black) is added by sifting it slowly into the band and allowing it to be taken up into the resin. The carbon-containing material is scraped and folded until a smooth plastic band is observed. Thereafter, 105 grams of $MnO_2$ dry powder is added. Again the powder is sifted into the mixture on the mill allowing time for the active material and resin to mix and band. Temperature control is important since at this point in the processing the mixture is heat sensitive. Using the components of the present tests, keeping the rolls at a 0.010 inch nip and at 75° C. gives a safe working mix. Higher temperatures may lead to an uncontrollable exotherm and mix ignition. The mix will behave in a safe manner for mixing and sheeting, but should not be allowed to remain on the mill for extended periods of time after it is mixed.

The material coming off the mill is smooth and peels from the mill surface. Such material is soft and flexible, and strong enough to allow trimming to size without cracking at the edges. Storage of the material at this point is practical. For use it can be, for example, heat pressed on to wire screen grids.

To form the porous material, the WSRN-10 is leached, e.g. in hot tap water. After all the WSRN-10 is leached out, the material can be dried (air drying of the material leaves approximately 1% moisture in the mix).

In this form, the dry, porous electrode absorbs both alkaline and acid electrolyte rapidly, and wets out completely.

Electrodes fabricated using $PbO_2$, $Ni(OH)_2$, or CdS as the active material instead of $MnO_2$, fibrillated-porous electrode materials are formed having processing and handling charactreistics similar to the material with $MnO_2$ as the active material.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. An electrode system comprised predominantly of electrochemically active material, said active material being encradled throughout a porous fiber-containing polymeric composition with maximized accessibility of the active material, and said system having been developed in the presence of a polymeric removable pore-former and consisting essentially, by weight, of about 0.5 to about 25% fibrillated polymer, up to about 25% conductive carbon, about 0.5% to about 20% supporting-contributing polymer and the balance essentially electrode active material, said electrode system having a porosity of about 70% to about 80% by volume and structural integrity, and being in the form of an unsintered, thin, porous, flexible sheet, said electrode system being further characterized in that it is comprised of discrete polymeric fibers throughout the electrode system, said fibers having been developed by a substantially dry processing technique in the presence of at least one of the components selected from the electrode active material, the support-contributing polymer and the pore-former, and said porosity, being interconnecting and having been developed by removal of the pore-former after the formation of the sheet.

2. An electrode system according to claim 1, characterized in that the system is electrically conductive and that it contains at least 0.5% conductive carbon.

3. An electrode system according to claim 1, characterized in that the fibrillated polymer comprises polytetrafluoroethylene.

4. An electrode system according to claim 1, characterized in that the precursor therefor contains about 70% to about 80% by volume of the removable pore-former.

5. An electrode system according to claim 1, characterized in that the removable pore-former is a leachable polymer.

6. An electrode system according to claim 1, characterized in that the sheet has a thickness of the order of about 1 to 10 mils.

* * * * *